United States Patent
Rosenbach et al.

(10) Patent No.: US 7,421,497 B2
(45) Date of Patent: Sep. 2, 2008

(54) METHOD AND SYSTEM FOR LOAD BALANCING OF COMPUTER RESOURCES AMONG COMPUTERS

(75) Inventors: Yariv Rosenbach, Hod Hasharon (IL); Nir Baram, Tel Mond (IL); Gregory Bondar, Rishon Lezion (IL); Igal Harel, Almon (IL)

(73) Assignee: SWsoft Holdings, Ltd. (BM)

( * ) Notice: Subject to any disclaimer, the term of this patent is extended or adjusted under 35 U.S.C. 154(b) by 497 days.

(21) Appl. No.: 10/487,481

(22) PCT Filed: Aug. 22, 2002

(86) PCT No.: PCT/IL02/00698

§ 371 (c)(1),
(2), (4) Date: Jul. 26, 2004

(87) PCT Pub. No.: WO03/019370

PCT Pub. Date: Mar. 6, 2003

(65) Prior Publication Data

US 2004/0243706 A1    Dec. 2, 2004

(30) Foreign Application Priority Data

Aug. 23, 2001  (IL) .................................... 145104

(51) Int. Cl.
*G06F 15/173* (2006.01)
(52) U.S. Cl. ................. 709/225; 709/201; 709/202; 709/223; 709/226; 718/105
(58) Field of Classification Search ................. 709/201, 709/202, 223, 225, 226; 718/105
See application file for complete search history.

(56) References Cited

U.S. PATENT DOCUMENTS

| 5,031,089 | A | 7/1991 | Liu et al. |
| 5,539,883 | A | 7/1996 | Allon et al. |
| 6,026,425 | A | 2/2000 | Suguri et al. |
| 6,128,279 | A | 10/2000 | O'Neil |
| 6,185,601 | B1 | 2/2001 | Wolff |
| 6,223,205 | B1* | 4/2001 | Harchol-Balter et al. .... 718/105 |
| 6,865,591 | B1* | 3/2005 | Garg et al. ................... 709/201 |
| 7,007,299 | B2* | 2/2006 | Ioele et al. ..................... 726/14 |
| 2001/0034752 | A1* | 10/2001 | Kremien ..................... 709/105 |
| 2003/0018927 | A1 | 1/2003 | Gadir et al. |

(Continued)

FOREIGN PATENT DOCUMENTS

WO    WO 00 10084 A    2/2000

*Primary Examiner*—Nathan Flynn
*Assistant Examiner*—Mohamed Wasel
(74) *Attorney, Agent, or Firm*—Bardmesser Law Group

(57) ABSTRACT

A method and system for balancing the load of computer resource(s) among a plurality of computers having consumers consuming the resource(s) is disclosed. After defining the lower threshold of the consumption level of the resource(s) and obtaining the consumption level of the resource(s) for each of the consumers and for each of said computers, the consumption level for each of the computers is compared during a period with its associated lower threshold. Whenever a computer having a consumption level of the resource(s) higher than the lower threshold is identified, a new layout of computer resource(s) for each of the consumers is determined. Consumer(s) are then shifted from their current location in the computer to a corresponding location in another computer according to the layout, so that the consumption level of the resource(s) for a computer may be reduced.

16 Claims, 2 Drawing Sheets

U.S. PATENT DOCUMENTS

| | | |
|---|---|---|
| 2003/0069903 A1 | 4/2003 | Gupta et al. |
| 2003/0191970 A1* | 10/2003 | Devine et al. ............... 713/201 |
| 2004/0162901 A1* | 8/2004 | Mangipudi et al. .......... 709/225 |
| 2005/0021848 A1* | 1/2005 | Jorgenson ................... 709/238 |
| 2006/0069723 A1* | 3/2006 | Ferwerda et al. ............ 709/203 |

* cited by examiner

METHOD AND SYSTEM FOR LOAD BALANCING OF COMPUTER RESOURCES AMONG COMPUTERS

This application claims priority to International Patent Application No. PCT/IL02/00698 filed on Aug. 22, 2002, which claims priority to IL Patent Application No. 145104 filed on Aug. 23, 2001.

FIELD OF THE INVENTION

The present invention relates to a method and system for balancing the load of a computer resource among several computers.

BACKGROUND OF THE INVENTION

The term Load balancing refers in the prior art to dividing the amount of work that a server must undertake between two or more servers of the same kind, so that more work is accomplished, and consequently all the clients will be served better (either more rapidly, or in a higher availability ratio). Load balancing can be implemented by hardware means, software means, or a combination of them.

On the Internet, Web sites having large throughput, usually use load balancing in order to achieve better performance of their Web servers.

Several approaches have been presented in the prior art for balancing the load between Web servers corresponding to a domain. One approach is to route each request in turn to a different server corresponding to the same domain name in the round-robin fashion (an arrangement of choosing all elements in a group equally in some rational order).

Typically, there is an element called a Load-balancer to which requests for service are directed, and from the load-balancer they are redirected to one of the servers participating in the balancing layout.

Since load balancing require multiple servers, it is usually combined with failover (i.e. automatically switching to a redundant or to a standby server) and backup services. According to this approach, there are two computers participating in the failover scheme, but only one computer (the main computer) is active, while the other (backup computer) stands-by. Whenever the main computer fails, the backup computer takes control over the IP, and starts serving as the Web server. The difference is that the backup computer does not serve any requests while in its standby mode. In some operations, the servers are distributed over different geographic locations.

Load-balancing methods known in the art are "request-directed"; i.e., a request for service (in the service/client mode) is directed to one of a group of servers providing the same service. Moreover, such methods are based on duplicating the service provider.

It is an object of the present invention to provide a method and system for balancing the load on a computer resource between computers, rather than balancing the requests for services, as in the prior art.

Other objects and advantages of the invention will become apparent as the description proceeds.

SUMMARY OF THE INVENTION

In one aspect, the present invention is directed to a method for balancing the load of computer resource(s) among a plurality of computers having consumers consuming the resource(s), comprising:

a) For each of the computers, defining the lower threshold of the consumption level of the resource(s);
b) Obtaining the consumption level of the resource(s) for each of the consumers;
c) Obtaining the consumption level of the resource(s) for each of the computers;
d) Periodically, comparing the consumption level for each of the computers during a period with its associated lower threshold;
e) Whenever a computer having a consumption level of the resource(s) higher than the lower threshold is identified, determining a new layout, being a definition for each of the consumers of the computer that corresponds to the current location of the consumer, from where the resource(s) are provided, and shifting consumer(s) from their current location in the computer to the corresponding location in the or in another computer according to the layout.

According to one embodiment of the invention, the consumption level is a numerical value representing the consumption of the resource(s) during a period. According to another embodiment of the invention, the consumption level is a numerical value representing the highest consumption of the resource(s) during a period.

The resource may be a disk quota, and/or network traffic, and/or CPU time, and/or system physical memory, and/or system virtual memory.

The consumers may be Web sites, and/or Web servers, and/or virtual dedicated servers, and/or computer users.

In another aspect, the present invention is directed to a system for balancing the load of computer resource(s) among a plurality of computers having consumers consuming the resource(s), comprising:

Measurement means for measuring the consumption level of the resource(s) on each of the computers;
A first software module, for retrieving the consumption level from the computers;
A second software module, for comparing the consumption level of the computers with their allowed lower threshold;
A third software module, for determining the consumer(s) to be moved, and the computer to be moved to; and
A fourth software module, for moving a consumer from one of the computers to another.

Optionally, the measurement means for measuring the consumption level of the resource(s) is a software module hooking calls for service(s) on each of the computer.

The first, second, third, and fourth software modules may be executed by one of the computers.

The system may further comprise a user interface for administrating the first, second, third, and fourth software modules.

BRIEF DESCRIPTION OF THE DRAWINGS

The above and other characteristics and advantages of the invention will be better understood through the following illustrative and non-limitative detailed description of preferred embodiments thereof, with reference to the appended drawings, wherein.

DETAILED DESCRIPTION OF PREFERRED EMBODIMENTS

With respect to a group of computers and a group of consumers that consume a computer resource(s) from said computers, the term layout refers herein to a definition for each of said consumers from which computer of said group said computer resource(s) should be provided. For example, the consumers are Web sites, and the resource(s) is the disk space and/or the data-traffic between a computer of said group and the Internet.

Figure 1:
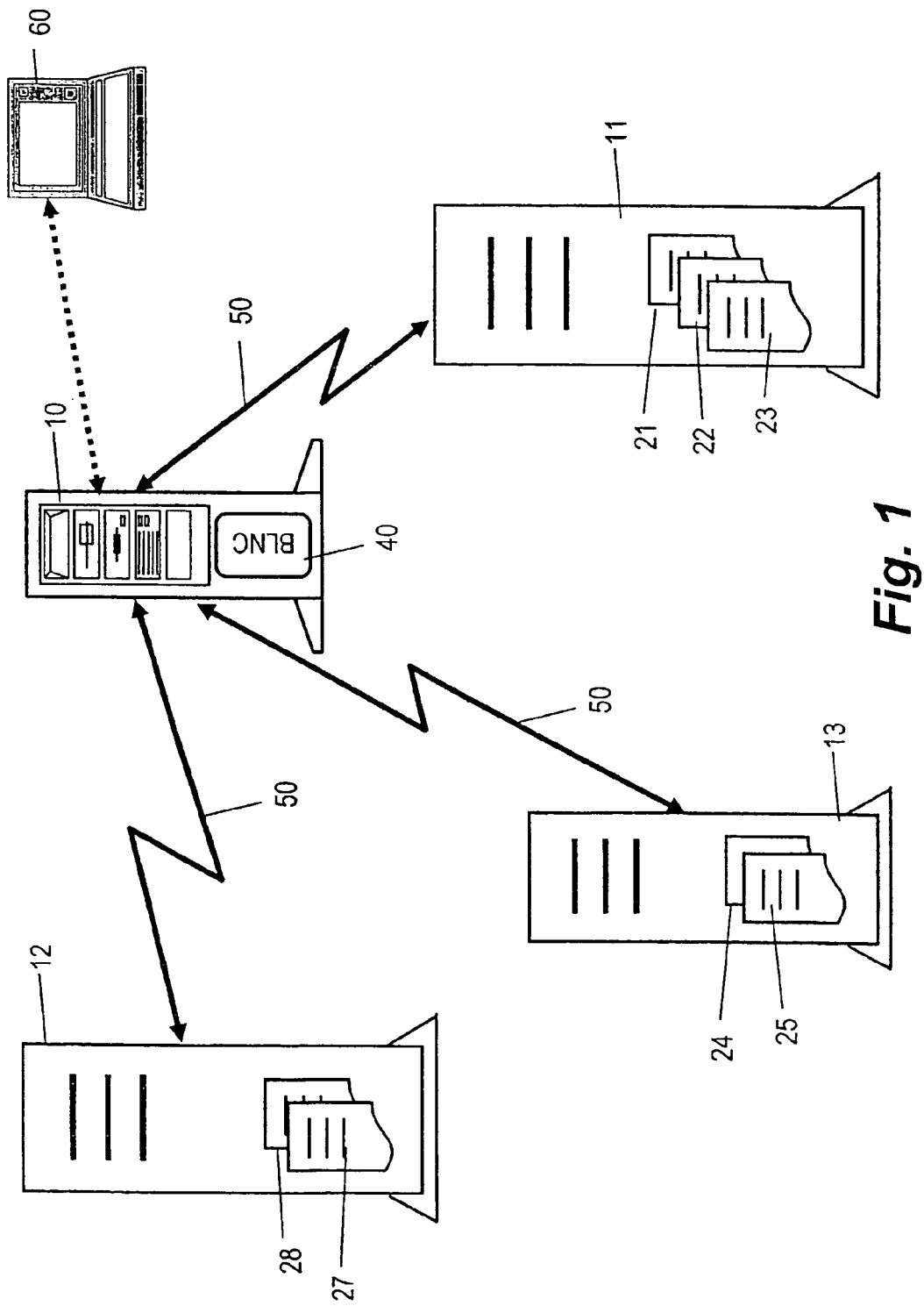
FIG. 1 schematically illustrates a layout for load balancing of network data-traffic of Web sites, according to a preferred embodiment of the invention.

FIG. 1 schematically illustrates a layout for load balancing of network-data traffic of Web sites, according to a preferred embodiment of the invention. The layout comprises computers 11, 12 and 13. Each of said computers hosts a plurality of Web sites: computer 11 hosts Web sites 21, 22 and 23; computer 12 hosts Web sites 27 and 28; computer 13 hosts Web sites 24 and 25. It should be noted that each of said Web sites might correspond to a different domain, and a different IP address.

The network data-traffic of computers 11, 12 and 13 is measured permanently, thus each byte transferred to and from the computer to and from the Internet is counted. Moreover, each byte that is sent to and from the Web sites hosted by said computer is counted as well. Each of said computers stores the information regarding its network data-traffic.

According to one embodiment of the invention, a software module 40, referred herein to as Balancing manager, is running on computer 10. The input for the balancing manager is the load of the balanced resources (network data-traffic, and so forth). By analyzing this information, the balancing manager 40 detects overloaded and under-loaded computers, decides if and which Web site to move and to which destination computer, and then controls the procedure of moving the Web site to its new destination.

Actually, the balancing manager 40 can run on every computer regardless the question of participating in the load-balancing layout.

For example, every week, the balancing manager 40 collects the data regarding the network data-traffic from said computers and checks whether the data traffic (per period) of a computer has passed beyond a predefined threshold. For example, the threshold for computer 11 is 75 MB per second, and the threshold for computer 13 is 20 MB per second. In this check, the balancing manager 40 has been detected that the average traffic load of computer 13 is 23 MB per second, the average traffic load of Web site 24 is 5 MB per second, and the average traffic load of Web site 25 is 18 MB per second. Since this computer is overloaded, one of its Web sites should be shifted to another computer, and by moving a Web site (no matter which one), the load of the computer 13 will become less then its threshold.

Of course, the balancing manager does not necessarily have to be connected to one of the computers of the group, but to a third computer that is connected with the other computers of the group.

Figure 2:
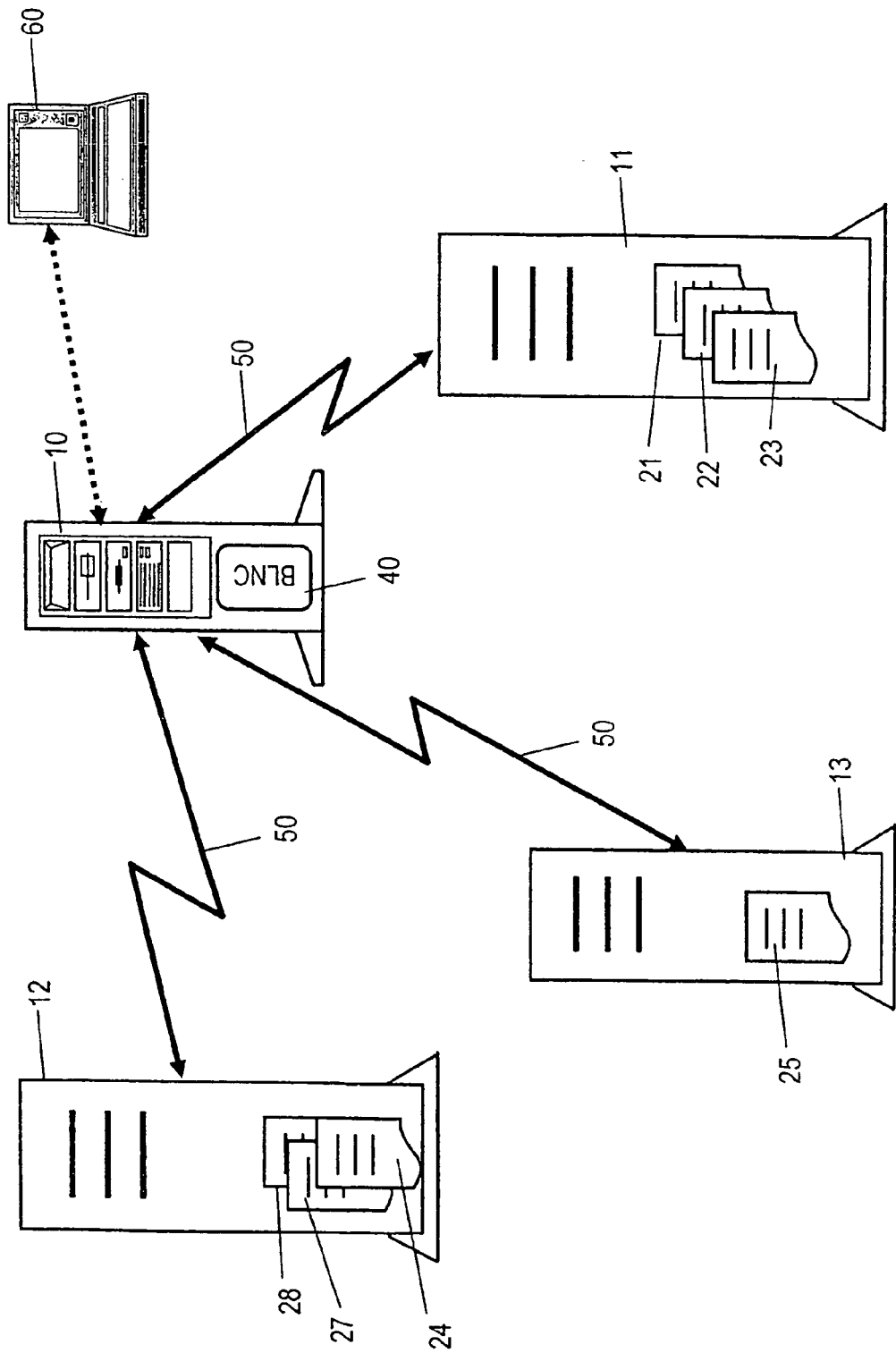
FIG. 2 schematically illustrates the layout illustrated in FIG. 1 after moving a Web site from one computer to another.

FIG. 2 schematically illustrates the layout illustrated in FIG. 1 after moving a Web site from one computer to another in order to balance the load of requests for service from said Web site. Web site 24 was shifted from computer 13 (as appears in FIG. 1) to computer 12.

The collection of the load information can be carried out through the Internet 50.

Optionally, the administrator of the computers can monitor and setup the parameters of the operation of the load-balancer using a terminal 60, connected to the computer that hosts the load-balancer via the Internet or other connection.

In order to allow comparing the consumption of a resource of one computer to the consumption of the same resource of another computer, a unit upon which the consumption will be measured should be determined. The unit upon which the consumption of a computer resource is measured is referred herein as to the consumption unit of a resource.

Usually, the consumption unit is a numeric value, since comparing numeric values can be easily implemented by a computerized machine, and is comprehensive to the human mind.

The consumption of a resource during a period is referred herein as to the consumption level of a computer resource. For example, the number of bytes passed to and from a port of a computer during a period.

The consumption level may also be a function of a plurality of computer resources. For example, data-traffic load and CPU load. More particularly:

$$R = (t/T + c/C)/2$$

Wherein:
R is the consumption level;
C is a period;
c is the total CPU time used for serving said Web site during said period;
T is the total data traffic of a computer during said period;
t is the total data traffic of a Web site on said computer during said period.

According to the invention, a balancing manager typically takes into consideration the consumption level of a resource in a computer, as well as the consumption level of the resource per consumer. For example, the resource is the network data-traffic and the consumers are the Web sites hosted by said computer. In this case, a suitable strategy will use both consumption levels in order to determine which Web site to move and to which computer.

A simple load balancing policy according to the invention is:
  to detect the overloaded computer as the source computer;
  to detect the most overloaded Web site hosted by this computer (the subject to be moved); and
  to detect the most under-loaded as the computer to which said Web site is to be moved.

Those skilled in the art will appreciate that there is a variety of methods known in the art for determining the consumer(s) to be moved, and the computer to be moved to, such as analyzing the flow in network.

EXAMPLE 1

The resource is the disk quota, and the consumers are the users of a computer.

EXAMPLE 2

The resource is the CPU time, and the consumers are the users are users of a computer.

EXAMPLE 3

The resource is the combination of network data-traffic and CPU, and the consumers are Web sites. In this case, the consumption level is a mathematical expression of the network data-traffic and the CPU, e.g., the CPU usage per second multiplied by the network traffic per second.

According to one embodiment of the invention, other considerations are taken for achieving a better load balancing. For example, if the network traffic of one Web site is overloaded during the daytime, while the second Web site is overloaded during the night, hosting both Web sites by the same computer system may produce a balanced load. Of course, in order to get the best deployments of Web sites/computers, optimization methods should be implemented. As will be known to the skilled person, such optimization methods are well known in the art.

Moving a Web Site from One Computer to Another Computer

Moving a Web site from one computer to another is a complicated process that involves the consideration of many parameters. For example:

The operating system, since some Web applications are oriented to a specific operating system, or contain a code that is targeted to a specific processor architecture.

License: According to the license, a utility (for example, a Web server) can be limited to a specific computer, and thus a Web site cannot be moved to every computer in the load balancing layout.

IP address: The DNS should be informed about the new IP address that corresponds to the domain.

More particularly, the verifications that the software and hardware used required by the Web site to be moved are:

The correct operating system (major and minor version);

The same hardware architecture as the source computer (i.e. the computer that hosts the Web site to be moved);

The same patches to the operating system as the source computer;

The same relevant products that are installed in the source computer, that is a Web server, Web server extensions, and other software products used by the moved Web site.

Adequate disk space for the domain.

According to one embodiment of the invention, the following steps are taken when moving a Web site from one computer to another:

Verifying that the domain can be moved, as described in the previous section.

Suspending the domain to be moved on the original computer (but allowing the other domains to continue to operate);

Creating a "tar" of the original domain. "Tar" is a utility for packing a plurality of files into a single file, such as the well-known utility "Winzip";

Creating an empty domain on the destination computer, with the appropriate name;

Copying the tar file to the destination computer, preferably in a secured way;

Opening the tar file on the destination computer, at the new domain created a few steps before;

Switching the IP of the domain to the destination computer (in some cases, the IP of a domain should be moved along with the files of the domain to the new computer). If the IP of the domain cannot be moved as well (e.g., if the IP was shared with other domains, or if the owner of the computers has some methods for allocating IPs to computers), the new IP of the domain is changed in all the relevant places—both in the internal files of the domain (such as the Apache configuration file) and in the external files (such as the DNS—so that users can accsess the site in its new place).

Starting the Web site in the destination computer;

After a proper operation of the moved Web site is obtained, removing the Web site (i.e. its files) from the source computer, and the tar file as well.

It should be noted that the user is allowed to override every check mentioned above, if he is sure that it is correct. For example, a Web site that comprises only static HTML pages can be moved from a Windows machine to a Linux machine, while a Web site employing ASP pages cannot (unless some special software is installed).

The Invention vs. the Prior Art

In the prior art, the load balancing was achieved by duplicating the Web servers of an overloaded Web site, thus serving the same amount of requests for service from said Web site by additional servers. The invention disclosed herein makes no use of duplication of a server. Instead, the Web site is moved from the overloaded hosting computer to another hosting computer, which typically is less overloaded.

The above discussion deals with balancing the load of Web sites between hosting computers, since this is an actual problem due to the increased use of the Internet. However, this method can be implemented for balancing the load of other computer resources, e.g. disk-quota, network data-traffic, CPU time, etc., that are used by other consumers, e.g. users, running programs, etc. In general, the invention is directed to a method for balancing the load of computer-resources between a plurality of computers having consumers consuming said resources.

Glossary

Client/server describes the relationship between two computer programs in which one program, the client, makes a service request from another program, the server, which fulfills the request. Although the client/server idea can be used by programs within a single computer, it is a more important idea in a network. In a network, the client/server model provides a convenient way to interconnect programs that are distributed efficiently across different locations. The client/server model has become one of the central ideas of network computing. Most business applications being written today use the client/server model. So does the Internet's main program, such as Web browsers and servers.

A Web server is the computer program that serves requested HTML pages or files. A Web client is the requesting program associated with the user. The Web browser in the user's computer is a client that requests HTML files from Web servers (using HTTP protocol).

A Web site is a related collection of Web files that includes a beginning file called a home page. From the home page, a Web browser (software used for accessing files on the Internet and displaying the files to a user) can get to all the other pages on the Web site. Actually, the access to the rest of the files can be restricted to some of all the users.

A client process referring to an IP address actually communicates with a Web server. A Web server is a program that using the client/server model "serves" requests for its services. Every computer on the Internet that contains a Web site must have a Web server program. On the one hand, a very large Web site may be spread over a number of servers in different geographic locations. On the other hand, one Web server can host a plurality of Web sites.

A Domain name is the part of the URL (Uniform Resource Locator) that indicates to a domain name server using the domain name system (DNS) whether and to which location to forward a request for a Web page or Web service. The domain name is mapped to an IP address, which represents an identifiable point on the Internet. On the one hand, a domain name refers to one IP address, on the other hand, a plurality of domain names can refer to a single IP address.

The domain name system (DNS) is the way that Internet domain name are located and translated into Internet Protocol addresses. A domain name is a meaningful and easy-to-remember "handle" for an Internet address.

Load balancer is the module that monitors and controls the operations regarding the load balancing of a load-balancing layout.

VDS: According to copending Israeli Patent Application No. 147560, an emulation of a computer system in which a remote client can access its system utilities and programs is referred to as a Virtual Dedicated Server (VDS).

The above examples and description have of course been provided only for the purpose of illustration, and are not intended to limit the invention in any way. As will be appreciated by the skilled person, the invention can be carried out in a great variety of ways, employing more than one technique from those described above, all without exceeding the scope of the invention.

The invention claimed is:

1. A method for balancing the load of computer resource(s) among a plurality of computers having consumers consuming said resource(s), comprising:
    a) For each of said computers, defining the lower threshold of the consumption level of said resource(s);
    b) Obtaining the consumption level of said resource(s) for each of said consumers;
    c) Obtaining a consumption level of said resource(s) for each of said computers by hooking calls for service(s) on each of the computers;
    d) Periodically comparing the consumption level for each of said computers during a period with its associated lower threshold;
    e) Whenever a computer having a consumption level of said resource(s) higher than said lower threshold is identified, determining a new layout, being a definition for each of said consumers from which computer of said group said computer resource(s) should be provided, and moving consumer(s) from their current location in the computer to the corresponding location in said or in another computer according to said layout, and which includes moving the consumer(s) from a computer with a first operating system to a computer with a different operating system, thereby reducing the consumption level of said resource(s) on said computer.

2. The method according to claim 1, wherein the consumption level is a numerical value representing the consumption of the resource(s) during a period.

3. The method according to claim 1, wherein the consumption level is a numerical value representing the highest consumption of the resource(s) during a period.

4. The method according to claim 1, wherein the resource is any of disk quota, network traffic, CPU time, system physical memory and/or system virtual memory.

5. The method according to claim 1, wherein the computers support any of Web sites, Web servers, virtual dedicated servers, and computer users.

6. A system for balancing the load of computer resource(s) among a plurality of computers having a plurality of Virtual Dedicated Servers (VDSs) consuming said resource(s), comprising:
    the plurality of VDSs running on the plurality of computers, each VDS servicing requests from clients, and multiple VDSs running on the same computer sharing a single instance of the operating system;
    each of the plurality of computers executing code for measuring the consumption level of the resource(s) on each of the computers by hooking calls for service(s) on each of the computers, the computers also executing code for implementing the steps of:
    retrieving the consumption level from the computers;
    comparing the consumption level of the computers with their allowed lower threshold;
    determining the VDSs to be moved, and the computer(s) to move the VDSs to; and
    moving a VDS from one of the computers to another, and which includes moving the VDS from a computer with a first operating system to a computer with a different operating system.

7. The system according to claim 6, further comprising a user interface for administrating the system.

8. A system for balancing the load of computer resources, the system comprising:
    a plurality of Virtual Dedicated Servers (VDSs) running on a plurality of computers, each VDS executing at least one user application and responding to requests from clients, and multiple VDSs running on the same computer sharing a single instance of the operating system;
    means for measuring the consumption level of the resources by each VDS on each computer;
    means for retrieving the consumption level from the computers by hooking calls for service(s) on each of the computers;
    means for comparing the consumption level of the resources on the computers by the VDSs with their allowed lower threshold;
    means for determining which of the VDSs need to be moved from one of the computers to a different computer, based on the comparison, and to which computer the VDS should be moved; and
    means for moving a VDS from one of the computers to a different computers, and which includes moving the VDS from a computer with a first operating system to a computer with a different operating system.

9. The system of claim 8, wherein the consumption level is a numerical value representing the consumption of the resources during a particular time period.

10. The system of claim 8, wherein the consumption level is a numerical value representing the highest consumption of the resources during a particular time period.

11. The system of claim 8, wherein the resource is any of disk quota, network traffic, CPU time, system physical memory, and/or system virtual memory.

12. The system of claim 8, wherein the VDSs support any of websites and webservers.

13. The system of claim 12, wherein the websites are static websites, and wherein the moving is performed without user intervention for configuration of the website to the different operating system on the computer to which the VDS has been moved.

14. A method for balancing a load of computer resources among a plurality of computers having Virtual Dedicated Servers (VDSs) consuming the resources, comprising:
    a) for each computer, defining a lower threshold of the consumption level of the resources by each VDS, wherein each VDS responds to requests from clients, and multiple VDSs running on the same computer sharing a single instance of the operating system;
    b) obtaining the consumption level of the resources for each VDS;
    c) obtaining a consumption level of the resources for each of the computers by hooking calls for service(s) on each of the computers;

d) periodically comparing the consumption level for each of the computers during a period with its associated lower threshold;

e) whenever a first computer having a consumption level of the resources higher than the lower threshold is identified, determining to which computer the resources should be provided, and moving VDSs from their current location in the first computer to a corresponding location in a second computer, and which includes moving the VDS from a computer with a first operating system to a computer with a different operating system, thereby reducing the consumption level of the resources on the first computer.

15. The method of claim 14, wherein the hooking of the calls is done for each VDS on a particular computer.

16. The method of claim 15, wherein the hooking of the calls is then done for the the particular computer.

* * * * *